Nov. 30, 1937.  F. MAYER  2,101,008
MITE KILLER ATTACHMENT FOR BIRD CAGE PERCHES
Filed June 6, 1936
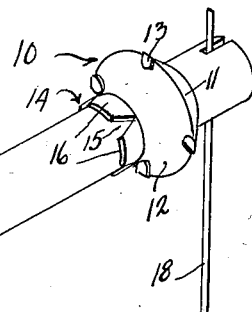
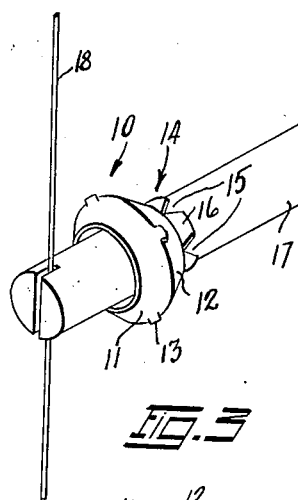
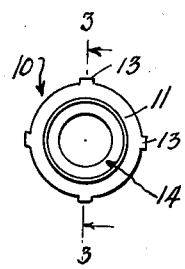
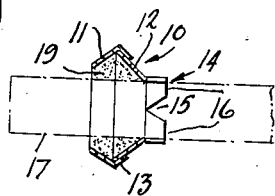
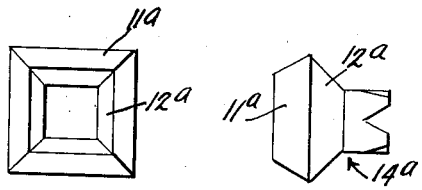
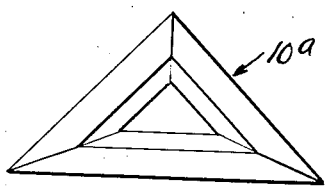
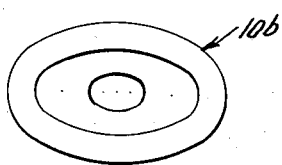
INVENTOR.
Frederick Mayer
BY
ATTORNEY.

Patented Nov. 30, 1937

2,101,008

UNITED STATES PATENT OFFICE 2,101,008

MITE KILLER ATTACHMENT FOR BIRD CAGE PERCHES

Frederick Mayer, New York, N. Y., assignor to Cornell Center Homeopathic Bird Remedy Co., Inc., New York, N. Y., a corporation of New York Application June 6, 1936, Serial No. 83,827

2 Claims. (Cl. 119—25)

This invention relates to means for preventing cage birds from becoming infested with mites, and has for one of its objects the provision of cup-like receptacles which may be attached to the perches of a cage and filled with a petroleum jelly, such as vaseline or the like, to capture and kill the mites before they can reach the bird.

Another object of the invention is to provide such a cup-like receptacle with a split boss, hub or collar for frictionally maintaining same on a bird-cage perch.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which Figure 1 is a perspective view of a bird-cage perch showing a pair of my mite killer attachments or receptacles secured thereon;

Fig. 2 is an end view of the receptacle;

Fig. 3 is a sectional view taken on line 3—3 Fig. 2 and showing in dot and dash lines a portion of the perch;

Fig. 4 is a front view of a modified form of the invention;

Fig. 5 is a side view thereof looking from the right of Fig. 4; and

Figs. 6 and 7 are front elevations of further modified forms of the invention.

All cage birds are subject to mites which are blood-sucking vermin that attack the birds at night and suck their blood. The loss of blood thus caused weakens the birds, causing them to lose their plumage and song and very often results in the death of the bird. It is to eliminate this danger to the health and life of cage birds that I have perfected my invention.

Referring now to Figs. 1 to 3 of the drawing in detail, 10 indicates my improved mite killer attachment which comprises a cup-like structure provided at the front thereof with a hollow frusto-conical portion 11 which is secured to a rear cup-like portion 12 by means of lugs 13 bent from the front portion 11. The rear portion 12 is provided with a ring-like split hub or boss 14 having serrations or cutouts 15 so as to form gripping portions 16 for frictionally engaging the bird-cage perch 17.

An attachment or receptacle 10 is provided at each end of the perch and the said receptacles are so located thereon as to provide a distance of at least one-half inch from the cage wires 18 to which the perch is attached so that no mite can crawl directly from the wire over the receptacle to the bird. The interior of the receptacle is then filled with vaseline or petroleum 19, the said filler acting to catch and kill the mite when it comes in contact with same.

In Figs. 4 and 5, I have shown a form of my invention in which the parts $11^a$, $12^a$ and $14^a$ are rectangular and are adapted to be used in connection with rectangular perches. In Fig. 6 the receptacle $10^a$ is shown as triangular and in Fig. 7 the receptacle $10^b$ is shown as being oval.

It is to be understood that receptacles of many other shapes than those shown may be provided. It is further to be understood that no matter what the shape of the receptacle may be, the opening in hub thereof may have any desired shape to fit any shape of perch.

From the foregoing, it will be seen that I have provided a simple yet effective mite killer attachment for bird cage perches.

Having described my invention, what I claim as new and desire to secure by Letters Patent is:

1. A mite killer attachment for bird cage perches comprising a horizontally extending hollow body open at its inner and outer ends, and a hollow hub extending outwardly from the body about the open inner end thereof for fitting about a perch, the wall of the body being channel-shaped in cross section to provide a receptacle having inner and outer wall portions diverging from each other towards ends of the body, and the open outer end of the body being of greater diameter than said hub to dispose margins thereof in spaced relation to the surface of a perch snugly received in the hub.

2. A mite killer attachment for bird cage perches comprising a horizontally extending hollow body open at its inner and outer ends and consisting of inner and outer wall sections having their outer peripheral edges contacting with each other, one wall section having tongues overlapping the adjoining edge portions of the other section and securing the sections together, said wall sections diverging from each other to form of the body a receptacle having walls V-shaped in cross section, and a tubular hub extending from the body about the open inner end thereof and adapted to grip a perch received therein, the open outer end of the body being of greater diameter than the hub to dispose margins thereof in spaced relation to the surface of the perch.

FREDERICK MAYER.